May 26, 1936.  E. A. STALKER  2,041,794

AIRCRAFT

Filed March 11, 1935  4 Sheets-Sheet 1

$\dfrac{y_m}{c} = h$ $\dfrac{t_m}{c} = t$

INVENTOR

Edward A. Stalker

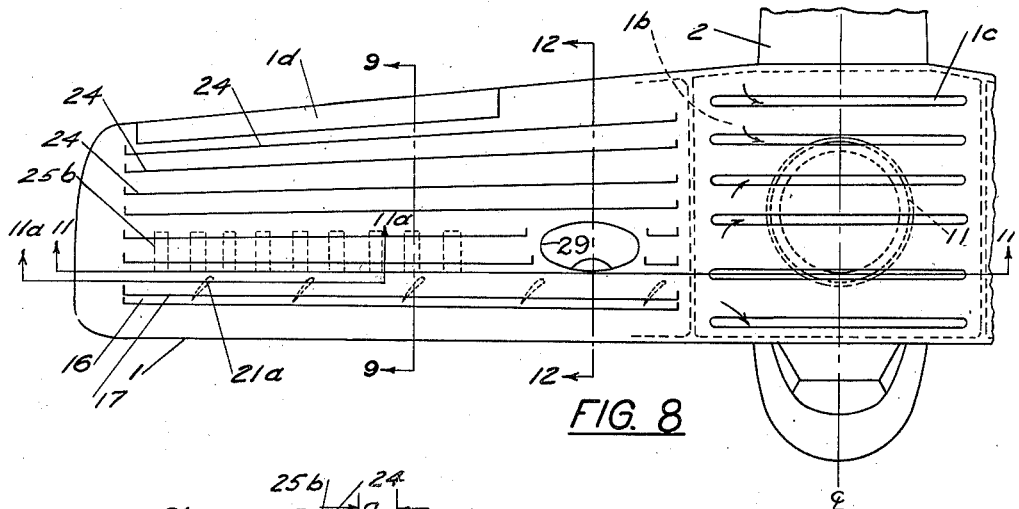
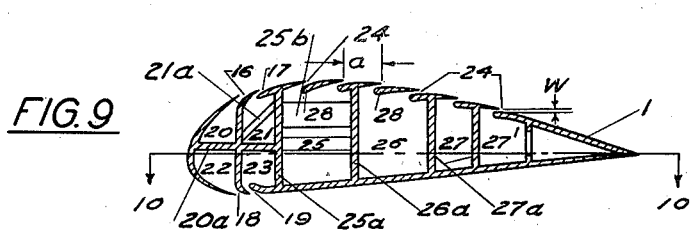
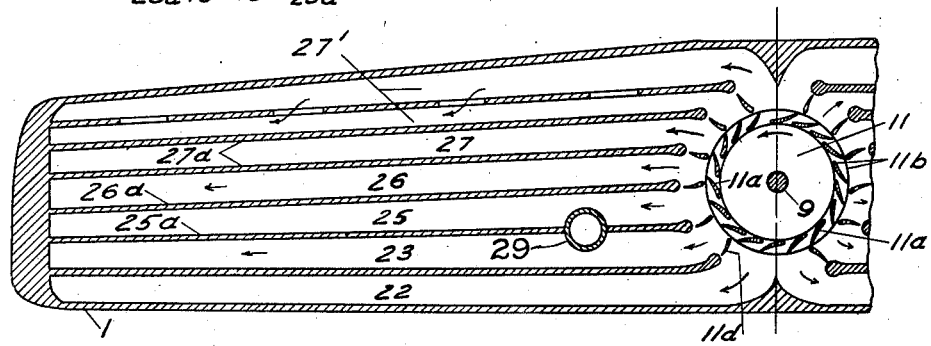
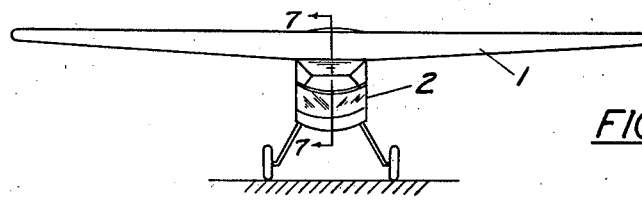
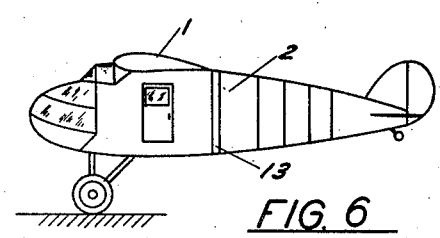

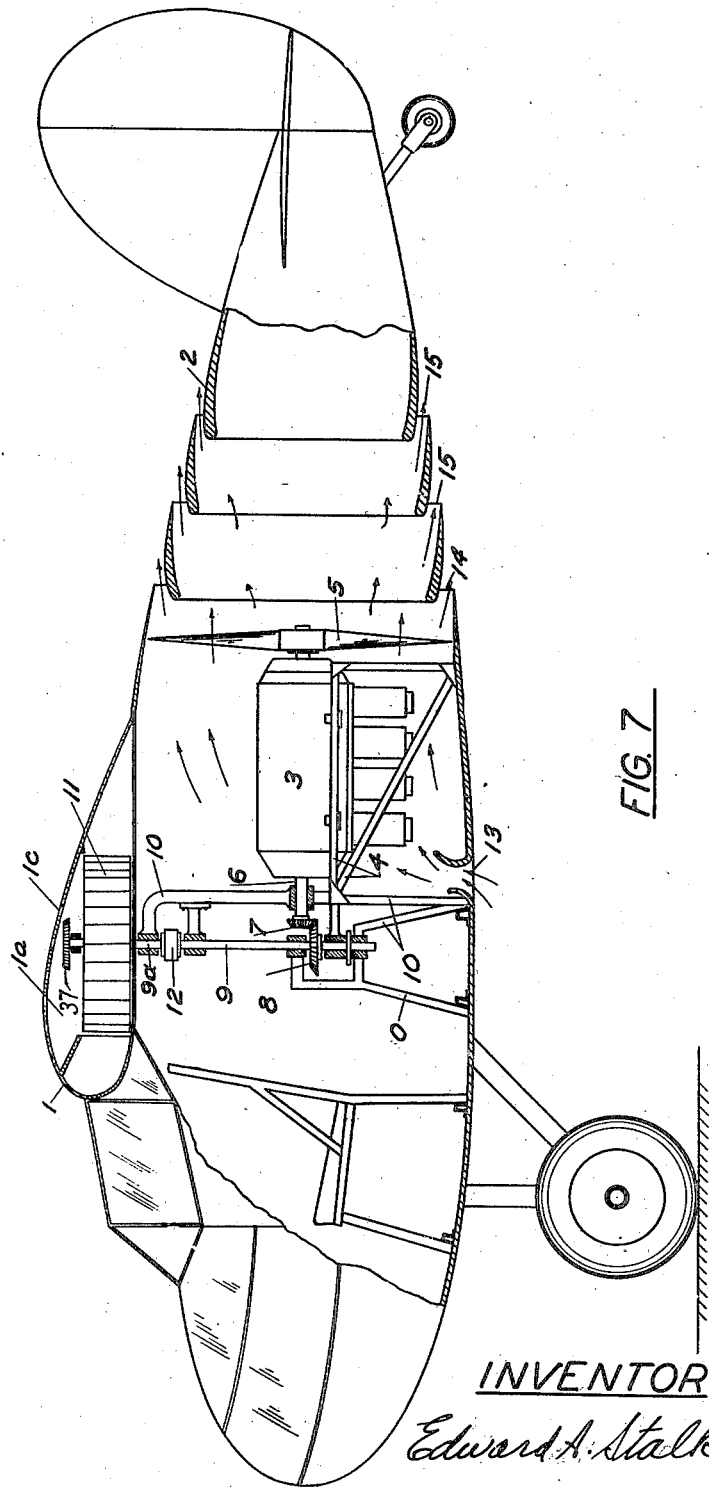

May 26, 1936.  E. A. STALKER  2,041,794
AIRCRAFT
Filed March 11, 1935  4 Sheets-Sheet 4
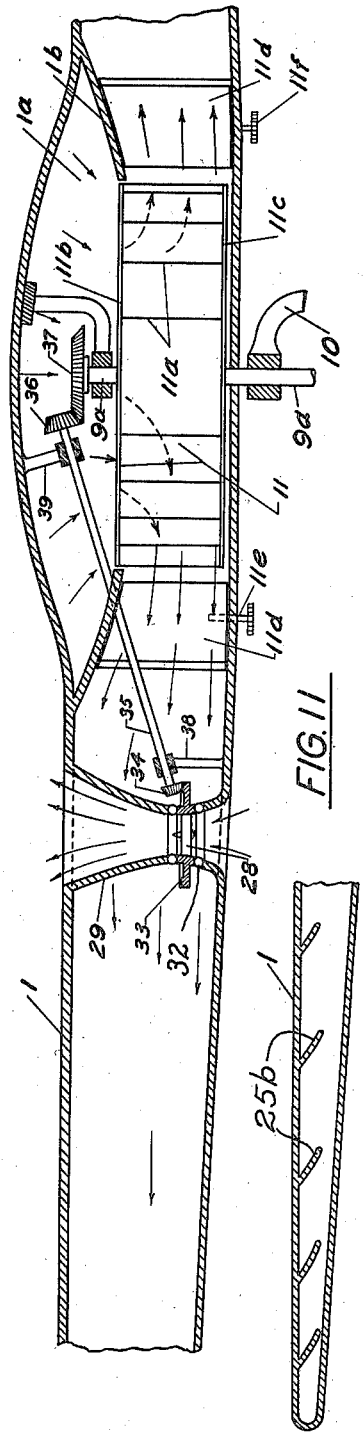
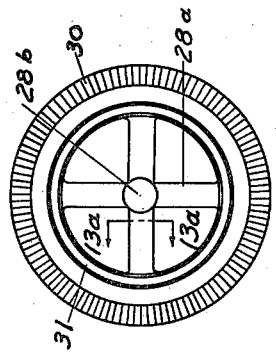
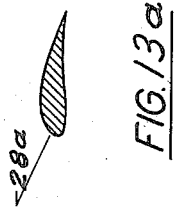
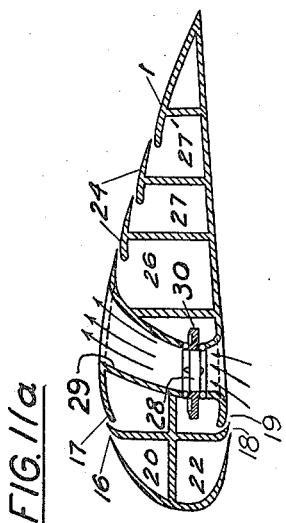
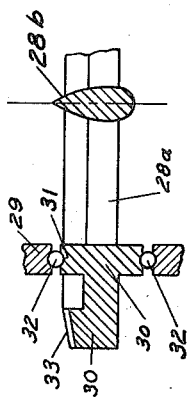
INVENTOR
Edward A. Stalker Patented May 26, 1936

2,041,794

UNITED STATES PATENT OFFICE 2,041,794

AIRCRAFT

Edward A. Stalker, Ann Arbor, Mich.

Application March 11, 1935, Serial No. 10,409

11 Claims. (Cl. 244—12)

My invention relates to aircraft, and particularly to the control of the boundary layer. The objects are, first, to provide means to control the boundary layer so that the resistance to flight is decreased; second, to provide means to control the boundary layer so that high lifting capacity is realized with a small expenditure of power; third, to provide means especially suitable for the propulsion of the aircraft with the aid of boundary layer control. Other objects will appear from the description and claims.

This application contains subject matter in common with my application Serial No. 726,113 filed May 17, 1934, entitled Aircraft. My application Serial No. 29,475 filed July 2, 1935 also contains related matter.

I execute these objects by the means illustrated in the accompanying drawings in which—

Figures 1, 2, 3, and 4 pertain to the theory;

Figures 5 and 6 are front and side elevations, respectively, of the aircraft;

Figure 7 is a fragmentary longitudinal vertical section of the aircraft taken along the line 7—7 in Figure 5;

Figure 8 is a fragmentary plan view of the aircraft;

Figure 9 is a chordwise section taken along line 9—9 in Figure 8;

Figure 10 is a horizontal fragmentary section of the wing taken along line 10—10 in Figure 9;

Figure 11 is a vertical fragmentary section of the wing taken along the line 11—11 in Figure 8;

Figure 11a is a fragmentary vertical section along the line 11a—11a in Figure 8;

Figure 12 is a chordwise section of the wing taken along line 12—12 in Figure 8;

Figure 13 is a plan view of the turbine;

Figure 13a is a section of the turbine blade along the line 13a—13a in Figure 13;

Figure 14 is a fragmentary section of the turbine ring and the casing to show the ball bearing method of mounting;

Figure 15:
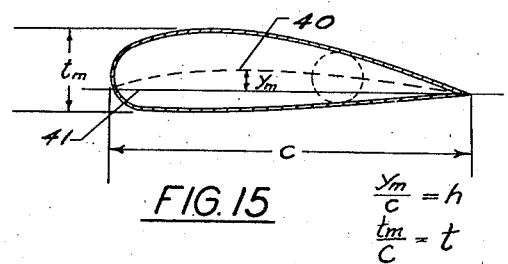

Figure 15 defines the significant geometrical properties of the preferred wing sections.

The central idea of the invention is that the aircraft and its parts can be bathed by a laminar flow so that the resistance to flight is reduced and the maximum lifting capacity increased for a given velocity and wing area. Also high velocity jets may be discharged outside of the laminar layer for propulsion by their mass reaction without the aircraft's surface being subjected to high frictional forces. The high frictional forces will be avoided because of the low velocity layer or laminar layer adjacent to the body surface.

Although the laws of the variation of fluid resistance on a flat surface for both laminar and turbulent flow have been known for a number of years the idea that an object as fast as the airplane can be bathed in a substantially laminar flow is new. A flow of air along a flat surface ceases to be entirely laminar when the Reynolds' number attains the value of 500,000 and on a curved surface such as a wing surface at much lower values. For instance, a small airplane having a 4-foot chord flying at 100 miles per hour would have a Reynolds' number of about 3,700,000—in other words far too high a value for laminar flow.

The boundary layer is the layer of fluid adjacent the surface of the body which has appreciably lower local velocities than would exist were the fluid inviscid. The loss in velocity is due to the frictional forces between the fluid and the body surface.

In the application referred to above I have described means to reduce the fluid resistance or drag of the aircraft by interposing a low velocity stratum between the body surface and the higher velocity jet employed along with the first to propel the aircraft.

This application sets forth even more efficient means of reducing the drag and propelling the aircraft.

I have also filed an application Serial No. 742,401 entitled Slotted wings, in which I have shown that the relative wind can be made to follow a curved surface such as the upper surface of a wing beyond the normal angle or curvature for which separation takes place by introducing a certain type of turbulence into the flow adjacent the surface. That is, if a fluid particle can be given an oscillatory velocity normal to the wing surface it can by its momentum, acquired in a fluid layer distant from the wing surface, transport energy into the boundary layer so that the layer becomes energized whereupon the flow continues to follow the surface. With such phenomena occurring the frictional resistance to the flow is large, as will appear from the discussion in the succeeding paragraphs. Although the introduction of certain types of turbulence into the flow causes higher ultimate lifting capacity to be made available than the energization of the flow by a simple jet without the introduction of specific turbulence, nevertheless the energy required for the boundary layer energization is larger than if laminar flow were made to prevail as described in this application. Thus two extremes are possible and are more effective than a simple jet: either a laminar flow or a turbulent flow having certain types of turbulence. The turbulent type is suitable for use in energizing the boundary layer to obtain high lifting capacity for landing but the laminar type is suitable for both high lifting capacity and for reducing the drag at low as well as high angles of attack and also gives even better maximum lift characteristics than the turbulent flow for a given amount of energy to be put into the flow. At high angles of attack when the flow has burbled and a violent eddying motion is present any type of boundary layer energization will decrease the amount of energy required to propel the wing, but this is not true for angles below that for which burbling occurs.

If a body surface is bathed by a fluid flow, it is customary to represent the frictional drag as $$D_f = C_{Df} \frac{\rho V^2}{2} A \qquad (1)$$

where $A$ is the area bathed, $\rho$ is the mass density of the fluid, $V$ is the stream velocity at a large distance from the surface so that it is substantially unaffected by the surface friction, and $C_{Df}$ is a non-dimensional coefficient.

Figure 1:
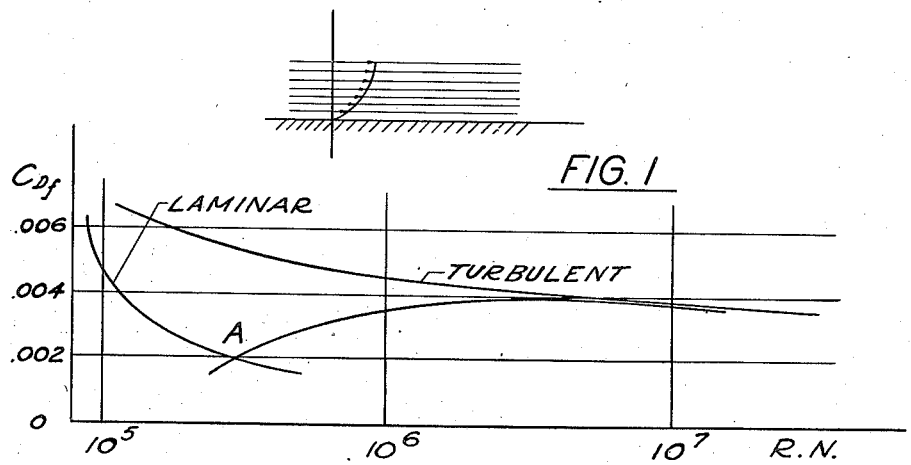

The magnitude of the friction $D_f$ is dependent on whether the boundary layer flow is turbulent or laminar. In the case of turbulent flow particles at one instant in touch with the body surface are later some distance from the surface. In laminar flow each stratum of fluid slides over the other and the relative positions are maintained. Figure 1 illustrates the velocity distribution in a laminar flow over the surface.

The frictional coefficient varies with the Reynolds' number (R. N.) which is defined as $$RN = \frac{V a \rho}{\mu} \qquad (2)$$

where $a$ is a length of the body along the relative wind and $\mu$ (mu) is the coefficient of viscosity of the fluid. The Reynolds' number is non-dimensional if a consistent set of units is used, like pounds, feet and seconds for the right-hand term. Figure 2 shows how the coefficient varies with Reynolds' number and also shows that there is a critical number (at A) at which the flow ceases to be purely laminar and progresses toward a purely turbulent character. If the flow is free of turbulence and the body is smooth the transition value of the Reynolds' number has a certain value A but if the flow contains some turbulence or if the body is rough the transition can occur at a smaller value of the Reynolds' number. In aircraft the body surface is made as smooth as possible and the wind gusts are of such magnitude that they envelope the whole wing, and therefore the gust can be considered simply as a change in wind direction. Experiments with full size aircraft substantiate this conclusion.

Only by taking great precautions can laminar flow be extended beyond the point A. The smallest disturbance in the air or slight jarring of the plate will precipitate the formation of the turbulent boundary layer. Theory gives the equation of the curve for laminar flow and this equation permits the extension of the laminar curve well beyond the point A.

It is to be noted that the curve for laminar flow lies well below the curve for turbulent flow. Hence if laminar flow could be maintained in the boundary layer the resistance coefficient $C_{Df}$ and hence the total frictional drag could be kept small. Actually on any present day aircraft wing or fuselage a turbulent boundary layer prevails. For instance, a wing having a four foot chord flying at one hundred miles per hour has a Reynolds' number of 3,750,000 so that the layer is definitely turbulent. If laminar flow prevailed the resistance would be about one-half the actual, as indicated by the laminar curve.

I have found it possible to bathe the wing with a laminar flow so that the resistance is low and so that a very high lifting capacity is obtained.

Figure 3:
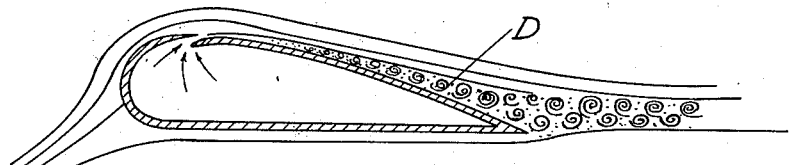

It is well known that the relative wind fails to follow the upper surface of a wing when it has a high angle of attack because of the formation of the boundary layer. It is also known that blowing a jet rearward tangentially to the surface will add energy to the boundary layer so that it is in part at least suppressed. This procedure is commonly called boundary layer energization. The lifting capacity then increases but the increases in lift have been disappointing in view of the energy employed in the jet. I have found two causes for the low effectiveness of the jet. In the first place the jet velocities employed have been so high that the frictional losses along the wing surface have been large, and the spacing of the jets has been such that the flow becomes turbulent and increases the frictional drag. In the second place a boundary layer of the jet itself forms which permits the jet itself to leave the wing surface. See Figure 3 where the eddying wake forms at D.

I arrange the jets in such a relation to the rest of the wing proportions that low resistance is obtained for high speed flight and a high lifting capacity to provide for slow speed landing. I use a plurality of jets emitted from a plurality of compartments, and I arrange that the jet velocity is low relative to the flight speed. I also keep the spacing of the jets small so that the Reynolds' number is low and therefore the flow remains laminar. When a jet is about to become turbulent as it traverses the space between jets a second jet is interposed between the first one and the wing surface so that the jet flow is not turbulent adjacent the wing surface. Each successive jet then serves to shield the wing surface from turbulence of the preceding jets. The vane-like strips of the surface between slots has a very small curvature so that the values of $C_{Df}$ for a flat plate can be applied to them. This means that the curves of Figure 2 are typical of the vanes as well as for flat plates. The space "$a$" between the jets is defined by $$a = \frac{100000 \mu}{V \rho} \qquad (3)$$

For atmospheric air $\rho$ has the standard value of 0.00237 and $\mu$ has the value of 0.000000374. The value of $\mu/\rho$ is then 0.000159. Values for other fluids are readily found in scientific works such as the "International Critical Tables".

It will be noted from Figure 2 that at a Reynolds' number of $10^6$ (one million) the drag coefficient $C_{Df}$ taken on the curve of transition from laminar to turbulent flow has attained almost the transition maximum, and so for low resistance the Reynolds' number should preferably not exceed 1,000,000 as an upper limit for air at atmospheric temperatures. For lower Reynolds' number the coefficient for laminar flow again attains the value at 1,000,000. Hence the best range of coefficient lies between these Reynolds' numbers.

To facilitate expression I refer to the flow as substantially laminar even for values of $C_{Df}$ and RN on the transition curve, since turbulent flow is not completely established until the RN has a value larger than 1,000,000.

The velocity V varies from the landing value to that of high speed and the greater the velocity of flight the smaller the length "$a$". Sixty miles per hour (88 feet per second) is about the maximum permissible landing speed for aircraft and for this value "$a$" equals one foot. A more practical landing speed for wings with boundary layer energization is 44 feet per second in which case "$a$" is two feet. At 150 feet per second, as for high speed, "$a$" becomes six inches while at still higher flight speeds the distance "$a$" becomes smaller and for very high speeds would approach zero as a limit. It appears then that in any practical design a compromise must be effected between landing and high speed. In some designs one will be favored over the other depending on whether a high maximum lift for landing or a low drag is desired for high speed. I prefer a value of about one foot or less for the airplane for general use.

The jet velocity out the upper surface should be larger than the velocity of the relative wind (flight velocity) because the local velocity on the upper surface arising from the relative wind will be larger. The flight velocity can, however, be taken as the lower limit of the jet velocity and actually could be used for the slots near the trailing edge, although I also prefer to keep the velocity out the last slot quite high, even somewhat higher than the jets just preceding.

For a given velocity V there would be no object in making the dimension "$a$" less than $$a = \frac{200000\mu}{V\rho}$$

since at the Reynolds' number 200,000 the drag coefficient $C_{Df}$ has risen for laminar flow to an equal value at 1,000,000 on the transition curve. But as has already been pointed out, for an increase in the velocity as the maximum flight speed increases, "$a$" approaches the minimum value zero no matter what the value of the Reynolds' number. Hence for the lower limit "$a$" always has the value zero.

Figure 4:
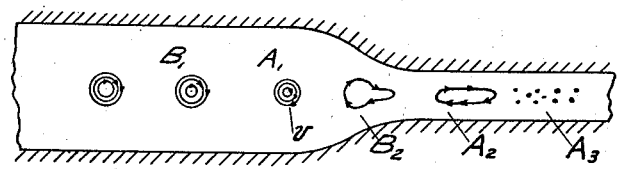

It is important that the jets upon issuing from the wing be as free from turbulence as possible. There is always some stray motion in a fluid but this is not regarded as turbulence until the sudden jump in resistance occurs as at the value of the Reynolds' number marked A in Figure 2. The fluid in the wing will tend to become turbulent due to friction on the compartment walls. By providing the proper slot and compartment proportions the turbulence in the flow can be "ironed" out or reduced to negligible size. If the slot has a smoothly curved entrance of rapid convergence the flow through it is speeded up with the results indicated in Figure 4. Consider the vortex or turbulent masses $A_1$ and $B_1$. The mass of $A_1$ is rotating with a certain peripheral velocity $v$ on the periphery and a certain stable velocity distribution prevails among the elements. As $A_1$ enters the slot the velocity of the jet increases and the mass of $A_1$ takes on the contour indicated at $B_2$. An instant later the whole mass is in the slot and has become greatly elongated as indicated at $A_2$. At the ends $A_2$ the particles on the periphery must execute a reversal of direction in a very short distance and at the velocity $v$. The particles are unable to make this turn and the whole mass of $A_2$ breaks up into minute rotating particles which are inoffensive. They represent "stray" motion similar to molecular motion and have a negligible effect on the laminar flow. Another way of expressing this disintegration is to remark that the opposed flows on the top and bottom sides of the elongated mass form unstable sheets because the particles have been shifted out of their former orderly relation where the velocity varied directly with the distance from the center of rotation. The velocity distribution is suddenly altered in the slot and the resultant velocity distribution is no longer a stable one. The organization of masses $A_1$ and $B_1$ are thus broken up and the energy of rotation is found in minute particles each rotating as an entity as these masses proceed through the nozzle.

In Figure 7 the wing is 1 and the fuselage is 2. Within the latter the engine 3 is mounted on the frame 4, driving the propeller 5. At the opposite end of the engine the shaft 6 carries the bevel gear 7 in mesh with bevel gear 8 fixed to the vertical shaft 9. A suitable frame 10 rotatably supports the gears 8 and shaft 9. The shaft 9a extends upward into the wing to the blower 11 which is fixed to the shaft. The shafts 9 and 9a have an overrunning clutch 12 operably joining them so that rotation of the shaft 9 can drive the blower but the rotation of the blower will not rotate the shaft 9. The purpose of this arrangement will be clear subsequently.

The fuselage has the opening 13 in its sides for the induction of air about the periphery near the maximum cross section of the fuselage. The air is inducted by the propeller 5 and discharged out the rearward directed slots 14 and 15. These slots extend about the periphery of the cross section. The slot 14 receives the flow from the outer portions of the propeller blades and consequently the flow has a high total head or pressure, that is, static plus dynamic head or pressure. Air from the inner portions of the blades passes out the slots 15 and since this air has a low total head it serves as a shield interposed between the high velocity flow from the tips. The frictional drag on the body surface is then less than if the high velocity flow were adjacent the fuselage surface. This is true whether the flow out the slots 15 is laminar or turbulent; but preferably the flows should be laminar. All the flows serve to propel the aircraft since a thrust on it results from the momentum imparted to the discharged fluid.

The wing has the slots 16, 17, 18, and 19 leading out of the compartments 20, 21, 22, and 23, as indicated in Figure 9. Other slots 24 lead out of compartments 25, 26, and 27. Referring to Figures 8 and 11 particularly, the blower 11 discharges air into all the compartments so that there is a rearward flow out each slot. The compartments are proportioned so that the jet of greatest velocity emerges from slots 16 and 18. The slots 17 and 19 emit fluid jets to shield the wing surface from the high velocity jets coming out of slots 16 and 18. The jets from slots 24 will also serve a similar purpose. All the slots are arranged so that the flow adjacent the surfaces of the vanes 28 formed between slots have substantially laminar flow thereon. Thus the distance "$a$" is determined to provide the laminar condition as described previously. The air blown out the slots by the blower serves to propel the aircraft in normal flight as well as to reduce the resistance.

The resistance is reduced for two reasons. The boundary layer is suppressed which enables the flow to follow the surface instead of producing a low pressure turbulent wake; and the flow which follows the surface causes little frictional drag because this flow is laminar.

More slots are placed in the upper surface because a suction or low pressure area prevails on this surface and the flow tends to leave the surface. That is, the surface curves from the flow and if a boundary layer of appreciable proportions were allowed to form the flow would not conform to the wing surface.

The aileron is indicated as 1d.

It is particularly important that many slots be employed for increasing the maximum lifting capacity. If the engine fails a descent must be made and a low flight velocity is desirable to avoid damage and injury. If the blower is driven by an independent source of power it can energize or suppress the boundary layer so that high lifting capacity is obtainable.

The blower 11 is located at the center of the wing span and draws air from the compartment 1a above the blower. This compartment is formed between the upper surface of the wing and the walls 1b which are joined to the wing upper walls as indicated in Figures 8 and 11. Air enters the compartment through the slots 1c shown in Figure 8, and its only access to the spanwise compartments is through the blower 11 as indicated in Figure 11.

The slots 1c withdraw the boundary layer from the wing surface and induce the relative wind to follow it so that high values of the maximum lifting capacity are attained and the drag is reduced. Since energy is added to the boundary layer in removing it, this process is also called boundary layer energization.

The blower 11 is comprised of a plurality of blades 11a supported between two plates 11b and 11c. The upper plate 11b is annular while the lower plate 11c is a disk. It is fixed at its center to the shaft 9a which rotates the blower.

As an independent source of power I prefer the turbine and casing contained in the wing. In Figures 8 and 11 the turbine is 28 and the casing is 29. The casing conducts a flow from below the wing to the region above due to the pressure difference about the wing. The turbine extracts energy from the casing flow.

The turbine is also shown in Figures 12, 13, and 14. The blades are 28a and they are supported at their outer ends by the ring 30. This ring has a groove 31 in the top and bottom faces so that it can be rotatably supported in the casing 29 on ball bearings 32 which roll in grooves 32 and corresponding grooves in the casing 29. At the center of the turbine there is a streamline fairing 28b to cover the ineffective center portion of the blades. The ring 30 carries the bevel gear 33 as indicated in Figures 11 and 14. Power from the turbine is transmitted to the blower 11 through the gears 33, 34, 36, and 37. A shaft 35 carries the gears 34 and 36 and is rotatably mounted in suitable bearings 38 and 39. It will be clear that a rotation of the turbine will rotate the blower 11 and since the shaft 9 below the blower has an overrunning clutch the turbine is relieved of the engine torque when the latter is not turning under power. Thus the blower is driven when the engine fails and a flow is induced out the slots in the wing surface. High angles of attack and high lifting capacity is then furnished when it is most needed.

The amount of energy available from the turbine is definitely limited and hence it is very important to utilize it as efficiently as possible in creating lift. High velocity jets are inefficient and have not proved adequate to provide really large augmentation of the lifts. Low velocity jets spaced at the proper distances overcome the defects of the turbine and conserve the energy from the turbine. In particular the substantially laminar flow saves much energy by reducing the frictional losses along the surface.

With boundary layer energization by ordinary jet schemes it is easier to reduce the drag on thick highly cambered wings because even at low angles of attack there is an appreciable separation of the flow from the wing or body surface. With thin bodies or wings a drag reduction at low angles of attack is achievable only by the introduction of laminar flow or a stratification of the flow. Under the latter flow conditions thin wings can be used. However, for maximum lift a thick, highly cambered wing is the most suitable for boundary layer energization, and for the commercial class of airplanes, as for private users, the maximum lift is the most important attribute since it permits low landing speeds.

Thick, highly cambered wing sections are supposed to be unsuitable for low lifting conditions, that is, for high speed flight. That is true for the conventional mode of propulsion wherein the wing is simply pulled through the air. If, however, the wing is bathed in a laminar flow, as I have indicated, the thickness and camber may have very high values because the flow of the relative wind is made to conform to the surface and the means of creating this adherence also reduces the resistance. Thus the jet means permits the use of such thick and/or highly cambered wing sections which in addition to their aerodynamic advantages just outlined also facilitates the reduction of wing weight and cost of production.

The mean camber line passes through the center of the circles inscribed in the airfoil contour, as indicated in Figure 15.

The maximum camber is best stated as the height $Y_{max}$ of the mean camber line 40 above the subtending chord 41 expressed as a fraction of the chord length "$c$". This fraction is indicated as $h$. The thickness $t_m$ is also best expressed as a fraction $t$ of the chord $c$.

I find that values of $h$ greater than 8 per cent and $t$ greater than 15 per cent greatly facilitate the production of high lifting capacity and yet give relatively low drags with the propulsive jets described.

When the slot width $w$ (Figure 9) is very narrow the jet is retarded on two sides so that a large percentage of the jet energy is destroyed by the frictional forces whose effect may extend to the center of the jet instead of being confined to a small fraction of the jet width. Also, if the slots are narrow a high velocity is usually required to discharge enough fluid to create an appreciable propulsive effect. A reduction in the drag does not then occur because the frictional forces of the jet exceed the drag reduction due to energization of the normal boundary layer arising from the relative wind. Actually, the boundary layer of the relative wind is replaced by a boundary layer of the jet and the velocities in this jet boundary layer consume any gain from the suppression of the normal boundary layer. Also, the jet boundary layer becomes turbulent and itself subsequently separates from the surface. Also, in becoming turbulent the thin jet dissipates a large proportion of its energy which would otherwise be effective in suppressing the normal boundary layer. The loss due to the turbulence in a thin jet is even more serious than the frictional retardation on two sides of the jet.

It is possible, however, to use narrow slot widths if the flow is kept laminar while in contact with the surface. This means that the length "$a$" between slots should be reduced as the slot width is lessened. The number of slots should be increased so that the same volume of fluid is discharged without a large increase in velocity. In this way the energy is conserved and the energization or suppression of the normal boundary layer results in a reduction of drag and at large angles in a great augmentation of the lifting capacity.

I have found that for the usual one or two slots in a wing that the slot width $w$ should lie between ½ and 6 per cent of the wing chord with a minimum slot width not less than about ⅛ inch. If laminar flow is maintained, however, the slot width can be less than ⅛ inch or ½ per cent, and I find that the width can be reduced preferably about in the proportion that "$a$" is reduced from the one-foot length given by Equation (3). It is to be understood, however, that I do not limit myself to this specific or linear relation between "$a$" and the slot width. The width $w$ in Figure 9 is not necessarily to scale.

If a certain quantity of fluid is available at a certain total pressure (static plus dynamic) and it is desired to divide this quantity between several compartments for emission at different velocities through surface slots, altering the widths of the slots will not change the velocities provided the energy is largely conserved and a significant quantity of fluid is allowed to flow. The velocity of discharge depends primarily on the total pressure in the compartment. It is the volume or quantity of fluid which depends on the slot width since this quantity is the product of slot area and velocity. Hence to have different velocities out the slots the total pressures in the compartments must be different. For a common source of fluid under pressure different pressures in the compartments can be provided only if the entrance to the compartment is constricted and the fluid is allowed to expand in the compartment. This means that the ratio between the volume of the compartment and the slot area must be large. From similar argument the ratio of the compartment flow must be large in proportion to the slot width "$w$". These are important features in carrying out the idea of employing laminar flow to reduce the coefficient $C_{Df}$. If the cross section is small or the volume is small in comparison to the slot width or slot area, extremely high pressures have to be used to obtain a distributed flow out the slot and this means high jet velocity which in turn means turbulent flow and high values of the frictional drag coefficient $C_{Df}$. Only if the pressure in the compartment were relatively high could the compartment be full of flow for its complete length without an adequate ratio between volume and slot area.

Fluid entering the compartment where it is to expand to a lower pressure than the source will tend to pack toward the downstream end of the compartment because of its momentum of influx. The fluid will then tend to flow more out the downstream end of the slot. An out-flow distributed along the length of the slot is desired and this may be accomplished by distributor vanes located in the compartment. These vanes are an important feature in the type of compartment flow just described.

In Figures 8, 9, and 10 I show how the fluid from the blower is diverted and divided between the respective compartments. The guide vanes 11d serve to restrict the flow to the compartments 21 and 23 while allowing a greater quantity to enter the compartments 20 and 22. That is, compartment 20 is to discharge at a greater velocity than compartment 21. Also, compartment 21 is to discharge at a greater velocity than compartment 25, each through their respective slots.

To accomplish the proper velocity distribution I provide that the compartment volume serving the slot is at least three times the magnitude of the slot area, that is, the product of slot width and slot length, using, of course, similar standard units of length.

The proper distribution of flow along the slot is obtained by the distribution vanes 21a or 25b. These are shown in Figures 8 and 9. The vanes are shown for clearness of the drawings in the compartments 21 and 25 only, but they should be used in all the compartments. Where there is only one slot per compartment, as in compartment 21, the vanes are preferably in the corner of the compartment after the fashion of vanes 21a in Figure 9. Where two slots prevail the vanes are chordwise across the compartment, as shown by vanes 25b.

It is desirable for best efficiency that the blower discharge directly into the compartments 20 to 21'. There should not be a long conducting tube to convey the flow from the blower to the compartments or slots. In particular there should be no tubes or conduits which incorporate right angle turns. Each right angle turn causes a loss in energy and a plurality of turns may dissipate a large proportion of the energy in the flow within the tubes.

By placing the blower 11 within the wing the fluid discharge goes directly into the compartments and the walls of the compartments or portions of them serve as the guide vanes of the blower. A portion of the compartment walls can be made movable as illustrated in Figure 11. The movable portions are indicated as 11d and each one is supported on a rotatable shaft 11e supported in the lower wall of the wing and the compartment wall 1b. A handle 11f renders it possible to adjust the vanes to the setting indicated as best by actual operation. The vanes can then be fixed in place by any of the methods such as a pin through the lower surface into the vane—not shown but a means familiar to any mechanic.

It is important that the jets be discharged along the surface, that is, more along than normal to the surface. Actually, the preferred direction is tangential to the surface so that all the energy of the jet is directed to add velocity to the boundary layer toward the trailing edge. If the slots do not have overlapping sides the jet flow will be normal to the surface and the jet will merely increase the tendency of the relative wind to separate from the surface. The slot sides should overlap and the direction of the slot axis should be rearward.

The walls such as 25a are continuous and so each compartment formed with them is closed to communication through them. At least there is no appreciable flow chordwise through these walls although a very small quantity such as would leak at joints or where moving parts of the control system pass through the walls can be tolerated. The compartments are thus substantially closed to each other except through the blower.

Communication is likewise prevented between upper and lower surface slots such as 16 and 18 by the wall 20a. As the angle of attack of the wing is changed the pressure distribution about the nose changes, a high pressure occurring below and a low pressure above the wing. The wall 20a assures that the flow will be out the slots and not from a lower slot to the upper, which would seriously interfere with the production of the lifting capacity.

The most significant portion of the wing surface is the forward two-thirds because this portion has the greatest curvature. The last one-third of the surface is ordinarily very closely flat and there is little tendency for the flow to leave the surface. The central half of the wing in the chordwise direction can be used to indicate a still smaller and still more significant area. Slots should occur in these portions, especially in the area just aft of the locality of maximum thickness of the wing section, since this is also a locality where the surface turns rapidly from the flow tending to cause separation. The portion of the upper surface of the wing containing the slots I call a surface region and the slots therein regional slots for ease of reference to them.

In addition to achieving laminar flow there is also another reason for locating the slots close together. The reversal of flow in the boundary layer on the upper surface can begin at any point or any number of points. If the surface is divided into a great many small areas a reversal in the boundary layer is localized to such an extent that it has negligible effects and can be regarded as suppressed. The reversal moreover would not extend forward beyond the next forward slot because the jet velocity increases toward the issuing slot.

A plurality of distributed holes can be substituted for a slot.

Any body bathed by a relative flow and creating a fluid force transverse to the flow can be regarded as a wing.

I have so far stressed the significance of the plurality of slots, especially on the upper surface, but there is another phase. On the lower surface the pressure is positive unless the lower surface is appreciably convex. Even with a small convexity and a positive angle of attack the under surface is essentially subjected to a positive pressure. On a pressure surface or a part of a surface subjected to pressure there is no danger of the relative flow separating from the surface and creating turbulence due to a reversal of flow direction in the boundary layer. It is possible therefore to discharge a fluid jet or sheet adjacent the surface with a lower velocity than the relative wind without fear of separating the flow from the surface. Such a sheet can be made laminar as regards its internal structure by passing it through a converging nozzle so that any initial turbulence engendered within the wing is suppressed. The action is that already described in connection with Figure 4. This laminar flow will precede along the lower surface between it and the relative wind and prevent the relative wind from causing a high drag due to its higher velocity. It will be a very appreciable distance along the surface before the relative wind has speeded up the jet fluid appreciably. Then the resistance of the lower surface will be lessened for two reasons, first because the low velocity layer is interposed between the relative wind and the surface, and second because the jet or sheet is laminar and therefore accompanied by a low coefficient of resistance over an appreciable length of the wing surface. It may become turbulent before the trailing edge is reached, but even so there will be a net gain because of the laminar expanse and because the relative wind would have become turbulent even sooner otherwise.

But there would be no point in saving on the lower surface friction if more energy is wasted inside the wing. For this reason the discharge from the blower should be directly into the wing interior without right angle turns, and the blower should be located in the wings. Efficient blowers have guide vanes in addition to the impeller vanes and, as shown in Figure 10, these vanes may also be part of the walls defining the compartment within the wing.

While the form of apparatus herein described represents a preferred embodiment of the invention it is to be understood that the invention is not limited to these precise forms nor to an aircraft only, nor the type illustrated, and that changes may be made therein without departing from the scope of the invention which is defined in the appended claims.

I claim:

1. A wing associated with a relative wind and having a hollow interior and a perforated upper surface of the wing to form at least three rearward directed spanwise slots, at least one of said slots lying aft of the locality of maximum thickness of the wing section, walls dividing the wing interior into a plurality of compartments in communication with said slots to control the jet velocities through the slots, said compartments being substantially closed to chordwise intercommunication along a major portion of their spanwise extent, the numerical magnitude of the volume of a compartment being larger than three times the numerical magnitude of the slot area, both volume and area being measured in the same units of length said relation between the compartment volume and slot area insuring effective allotment of fluid to the slots with low pressures within the compartments, a blower means in substantially closed communication with the wing interior to cause a jet flow through the slots, said slots being distributed chordwise so that the slotted expanse of surface between at least three slots is a major portion of the forward two-thirds of the wing chord so that a jet from a slot is interposed between the wing surface and the preceding jet before the preceding jet develops significant turbulence thus providing that the wing is bathed in a low resistance flow to diminish the energy required for the jets.

2. A wing having a hollow interior, a perforated upper surface of the wing to form three or more slots extending along a major portion of the semi-span and directed substantially along the surface toward the trailing edge so that the slotted expanse of surface between the first and last slot is a major portion of the forward two-thirds of the chord length, at least one of said slots lying aft of the locality of maximum thickness of the wing section walls to divide the wing interior into a plurality of separate compartments some in communication with different said slots to provide for different jet velocities, the numerical magnitude of the volume of a compartment being at least three times the numerical magnitude of the slot area, both volume and area being measured in the same units of length, blower means in substantially closed communication with the hollow interior to provide a flow of fluid out the slots, said relation between the compartment volume and slot area insuring effective allotment of fluid to the slots with low pressures within the compartments, said slots being spaced chordwise at a distance less than one foot so that a jet from a slot is interposed between the wing surface and the preceding slot jet before the preceding jet develops significant turbulence whereby the boundary layer is energized efficiently.

3. In a wing associated with a relative flow of fluid tending to leave the wing surface and having a hollow interior divided into a plurality of separate compartments substantially closed to chordwise intercommunication along a major portion of the spanwise length of the compartment and extending along a major portion of the semi-span, a perforated upper surface to form at least three slots in communication with said compartments which serve to control the flow through the slots, the said slots being distributed along at least a major portion of the forward two-thirds of the chord length, at least one of the slots lying aft of the locality of greatest thickness of the wing section, blower means to cause a flow spanwise in the compartments and out through the slots to energize the boundary layer on the wing surface and thereby suppress the tendency of the flow to leave the surface, said slots being spaced chordwise at distances less than $$a = \frac{1{,}000{,}000\mu}{V\rho}$$

so that the succeeding jets energize the boundary layer of the preceding jets to suppress the formation of jet boundary layers between the jet and the wing surface, at least some of the compartments having a chordwise cross sectional area at the locality of entrance of the jet fluid into the compartments substantially larger than the area of the slots associated therewith to provide effective low velocity slot jets with low fluid pressures within the said compartments.

4. In an aircraft, a fuselage, a wing to support the fuselage and having a hollow interior divided into compartments, rearward directed slots in the wing surface in communication with the said compartments, said fuselage having rearward directed slots in its surface, a propulsive means of blowing substantially within the wing comprising a vertical shaft and a plurality of blades rotatable about a substantially vertical axis, said shaft extending downward into the fuselage, said blades discharging fluid into said wing compartments and out said slots, a plurality of blades rotatable in the fuselage by an element having a substantially horizontal axis of rotation to discharge fluid rearward from said fuselage slots, said vertical shaft and said element being rotatably interconnected, and a propulsive prime mover to rotate the said shaft and element whereby fluid jets are dischargeable from the aircraft slots to energize the boundary layer for reducing the resistance and to provide a propulsive thrust.

5. In a hollow wing associated with an external flow of fluid and having slots in the upper surface in communication with the wing interior for use in energizing the boundary layer, a means of reducing the resistance between the wing and the relative flow, said means comprising a perforated lower surface of the wing to form a rearward directed slot in communication with the wing interior and extending spanwise along a major portion of the wing area and having overlapping sides to direct a fluid discharge chiefly rearward substantially along to the surface, a propulsive means of blowing in communication with the wing interior to discharge fluid out the lower surface slot at a velocity lower than the external flow velocity, said wing being adapted to exclude said low velocity discharge fluid on the discharge side of the means of blowing from discharge through the upper surface slots of the wing to avoid a separation of the external flow from the upper surface where the external flow velocity is higher than the flight velocity, said fluid discharge from the lower surface serving to interpose a layer of fluid between the lower surface and the flow adjacent the lower surface ahead of said lower surface slot whereby the frictional forces on the lower surface of the wing are reduced, said lower surface of the wing aft of said slots being in major part closed to direct air communication through the wing to the region above the upper surface.

6. In an aircraft, a wing having a hollow interior and a perforated upper surface to form at least three rearward directed slots leading out of the wing interior and distributed chordwise along a major portion of the forward two-thirds of the chord length, at least one of said slots being aft of the locality of maximum thickness of the wing section, a blower means in substantially closed communication with said wing interior to cause an outward jet discharge through the said slots toward the trailing edge of the wing, said slots having overlapping sides to direct the flow substantially along the wing surface and being spaced chordwise at a distance less than one foot so that a jet is interposed between the wing surface and the preceding jet before the preceding jet develops significant turbulence, thus providing that the frictional resistance to the fluid flow is diminished, said slots having on the average an individual width less than one-half of one per cent of the chord length.

7. In combination, a wing having a hollow interior for the conduction of fluid within and a spanwise slot just aft of the locality of maximum thickness of the wing section and a plurality of spanwise slots in the upper surface on each side of the first said slot, all said slots being in the upper surface and leading out of the said wing interior and formed to discharge rearward substantially along the wing surface, said slots being distributed along at least a major portion of the forward two-thirds of the wing chord length, and blower means in substantially closed communication with the said wing interior to induce a rearward flow out the said slots, said wing interior having a volume whose numerical magnitude is at least three times the numerical magnitude of the combined area of the slots leading out of said interior both volume and area being measured in the same units of length, said slots being supplied with fluid from said interior which is full of fluid flowing to said slots, said slots being spaced at a distance less than one foot and 20 per cent of the wing chord length so that the jets cooperate to conserve the energy of the jets to provide a maximum of boundary layer energization for a given energy expenditure in the jets, the said relation between the magnitudes of the volume and slot area providing with a low fluid pressure for an economical distribution of jet velocity along the slot length to augment the conservation of energy arising from the chordwise spacing of the jets.

8. In an aircraft in combination, a wing having a hollow interior and a spanwise slot in the upper surface just aft of the locality of maximum thickness of the wing section and a plurality of spanwise slots in the upper surface on each side of the first said slot, said slots being in communication with the wing interior and being rearward directed to discharge fluid substantially along the wing surface toward the trailing edge, and a blower means in substantially closed communication with the wing interior to discharge fluid jets out said slots, said slots being spaced chordwise at an average distance along the chord less than the quotient of the product of one million by the coefficient of viscosity of the jet fluid divided by the product of a flight velocity and the jet fluid density, said slots being distributed along at least a major portion of the forward two-thirds of the wing chord, said wing interior being divided into at least two spanwise compartments substantially closed against chordwise intercommunication along a major portion of their spanwise length, some of said slots being in communication with one compartment and some with another compartment so that different velocities can be imparted to different jets, the numerical magnitude of the volume of a said compartment being at least three times larger than the numerical magnitude of the area of the slots associated with said compartment both volume and area being measured in the same units of length so that an effective velocity distribution is achieved spanwise with low fluid pressure within the compartment, said combination providing the proper jet distribution spanwise and chordwise so that the flow relative to the wing is induced to follow the wing surface with a low expenditure of energy.

9. In combination, a hollow wing associated with a relative flow of fluid and having at least two separate compartments within substantially closed to chordwise intercommunication along a major portion of their spanwise extent and two slots in the lower surface each leading out of a separate compartment, said slots extending spanwise along a major portion of the wing area and having overlapping sides to direct fluid rearward substantially tangentially to the wing surface, a propulsive means of blowing in communication with said compartments and cooperating with them to discharge fluid jets of different velocities from said two slots rearward along the lower surface, the jet of lower velocity being aft of the higher velocity jet and adjacent the surface, the lower surface of the wing aft of the low velocity slot presenting a relatively smooth surface expanse of substantial chordwise extent so that the low velocity jet shields this surface expanse from the frictional resistance of the high velocity jet, said lower surface aft of said slots being closed along a major portion of the span to direct air communication upward and forward through the wing to the region above the upper surface.

10. A wing having a nose of streamline form in the direction of the local flow past the nose to direct the flow over the upper surface and thereby give a boundary layer adapted for energization, said wing having a hollow interior and having at least three rearward directed regional slots in the upper surface region occupying the central one-half of the wing chord length, the distance between the first and the last slot chordwise in the said surface region being a major portion of the chordwise extent of said region, at least one of the said regional slots lying aft of the locality of maximum wing thickness along the chord, said slots extending spanwise along a substantial portion of the wing area and being in communication with the wing interior and rearward directed to discharge fluid substantially rearward along the wing surface, and blower means in substantially closed communication with the said interior to induce a flow out said slots, said slots being spaced chordwise at a distance less than $$a = \frac{1,000,000\mu}{\rho V}$$

so that a jet is interposed between the wing surface and the preceding jet before the preceding jet develops significant turbulence thus providing that the wing is bathed in a substantially laminar flow.

11. In combination a wing having a hollow interior for the conduction of fluid within and having at least three spanwise regional slots in the upper surface region occupying the central one-half of the wing chord length, the distance between the first and last slot chordwise in the said surface region being a major portion of the chordwise extent of said region, at least one of the said regional slots lying aft of the locality of maximum wing thickness along the chord, said slots extending spanwise along the wing area so as to be significant in energizing the boundary layer on the wing and leading out of the said interior and being rearward directed to discharge fluid rearward substantially along the wing surface, said wing interior having a volume whose numerical magnitude is at least three times the numerical magnitude of the combined area of said slots leading out of said interior both volume and area being measured in the same units, and blower means in substantially closed communication with said wing interior to fill it with a flow of fluid for discharge out said slots, said slots being spaced chordwise at an average distance less than $$a = \frac{1,000,000\mu}{\rho V}$$

so that the jets cooperate to conserve the energy of the jets to provide a maximum of boundary layer energization for a given expenditure of energy in the jets, the said relation between the magnitudes of the volume and slot area providing with a low fluid pressure for an economical distribution of jet velocity along the slot length to augment the conservation of energy arising from the chordwise spacing of the jets.

EDWARD A. STALKER.